United States Patent

Shoap

[15] 3,646,451

[45] Feb. 29, 1972

[54] TIMING EXTRACTION CIRCUIT USING A RECIRCULATING DELAY GENERATOR

[72] Inventor: Stephen Davis Shoap, Matawan, N.J.

[73] Assignee: Bell Telephone Laboratories, Incorporated, Murray Hill, N.J.

[22] Filed: Aug. 7, 1970

[21] Appl. No.: 62,014

[52] U.S. Cl. .................................328/63, 178/69.5, 178/70, 307/269, 325/13, 328/120

[51] Int. Cl. .........................................................H041 25/66

[58] Field of Search ..............178/69.5, 70; 179/15; 307/269; 325/13; 328/63, 72, 119, 120

[56] References Cited

UNITED STATES PATENTS

| | | | |
|---|---|---|---|
| 3,057,959 | 10/1962 | Rowe | 178/69.5 X |
| 3,085,200 | 4/1963 | Goodall | 325/13 |
| 2,802,051 | 8/1957 | Prior et al. | 178/69.5 |
| 2,992,341 | 7/1961 | Andrews, Jr. et al. | 307/269 |
| 3,110,768 | 11/1963 | Pustelnyk | 178/69.5 X |
| 3,246,243 | 4/1966 | Widl | 325/13 |
| 3,458,822 | 7/1969 | Hahn, Jr. | 328/120 |
| 3,510,787 | 5/1970 | Pound et al. | 328/63 X |

*Primary Examiner*—Donald D. Forrer
*Assistant Examiner*—R. C. Woodbridge
*Attorney*—R. J. Guenther and E. W. Adams, Jr.

[57] ABSTRACT

A timing circuit generates the timing signal used in the regeneration of pulse code modulation signals by taking a previously regenerated signal and inserting pulses where they are missing from the original signal. The inserted pulses are created in a recirculating delay generator which is synchronized with the incoming data and whose outputs is inhibited by delaying the input pulses for various periods and applying them to the output gate of the generator so that an output pulse from the generator is available only when there is no input pulse. The output of the generator is then summed at the output gate of the circuit with the original signal, producing a continuous stream of timing pulses.

5 Claims, 9 Drawing Figures

INVENTOR
S. D. SHOAP
BY David P. Kelley
ATTORNEY

TIMING EXTRACTION CIRCUIT USING A RECIRCULATING DELAY GENERATOR

BACKGROUND OF THE INVENTION

This invention relates to regenerative repeaters and, more particularly, to timing circuits for self-timed regenerative repeaters of the type employed in pulse code modulation and similar communications systems.

When pulses have been transmitted over large distances they become degraded due to crosstalk, noise and overall attenuation. To amplify and retime these pulses, the regenerative repeater samples the incoming pulse train at proper time intervals and makes a decision as to whether the data bit is a "1" or a "0." Any excess pulse "jitter" may be enough to cause a pulse displacement on the time scale to the extent that the identities of the incoming "1's" and "0's" are lost and regeneration is impossible. Therefore, it is necessary to extract the timing information from the pulse train itself.

In the past, the timing information for the regenerator has been extracted from the incoming signal using a bandpass filter tuned to the basic pulse repetition rate. However, when there are large gaps in the pulse train it is very difficult to extract the timing information, due to the loss in frequency content at the pulse repetition rate. An improvement in this technique is disclosed in U.S. Pat. No. 2,992,341 of F. T. Andrews, Jr., issued on July 11, 1961. The arrangement of that patent involves adding the extracted timing signal back onto the regenerated signal before transmission, thereby increasing the frequency content at the pulse repetition rate for the next repeater. A further improvement is made by using a voltage-controlled oscillator and a phase detector at each repeater and phase-locking the oscillator to pulses of the data train, whenever they are present. This technique is illustrated in U.S. Pat. No. 3,085,200 of W. M. Goodall, issued on Apr. 9, 1963. However, even with this arrangement the basic problem of extracting the timing information during large gaps in the pulse train remains.

SUMMARY OF THE INVENTION

The present invention is directed to reducing the problem of extracting timing information from a pulse train by using a delay recirculator to inject pulses into the data train whenever they are missing. This eliminates the need for a bandpass filter and simplifies the phase detector since pulses are always available for comparison with the voltage-controlled oscillator. In addition, the recirculator is instantaneously phase-corrected on the occurrence of pulses while the older filter method produced an output that was an average of the input pulses and hence not immediately responsive to phase changes. The use of a recirculating generator was disclosed in U.S. Pat. No. 2,827,566 of S. Lubkin, issued on Mar. 18, 1958. The Lubkin patent demonstrated a method of changing frequency and eliminating the effects of transient pulses which are peculiar to recirculators.

In an illustrative embodiment of the invention the incoming pulse train is applied to a unit delay element of any standard type, for example, a length of coaxial cable or a network of passive elements. The output of the delay element is applied to a recirculator made up of a two-input gate, a second delay equal to the period of the input pulse train and a multiple-input gate, all connected in series. The output of the multiple-input gate is coupled back to the second input of the two-input gate creating the delay recirculator. The incoming pulse train is also applied to another unit delay and thence to a two-input gate which acts as the output gate of the circuit. The output of the recirculator is applied to the second input of this circuit output gate. This output gate combines the input pulse train with the output of the recirculator, producing a continuous series of pulses. The multiple input gate of the recirculator also has the incoming data pulse, the incoming data pulse delayed one time unit, and the incoming pulse delayed two time units applied to it. The effect of these three inputs is to inhibit the recirculator whenever an incoming pulse is present. If the spacing of these inputs is varied, through changes in the value of the unit delays or by adding other delays, the circuit can be made to delete automatically transient pulses present in the recirculator. These transient pulses could be created by electrical noise or by "turn-on surges." The arrival of a valid input pulse will cause the multiple input gate to inhibit for a whole period, thereby eliminating any transient pulse present in the recirculator.

The foregoing and other features of the present invention will be more readily apparent from the following detailed description and drawings.

DETAILED DESCRIPTION

Figure 1:
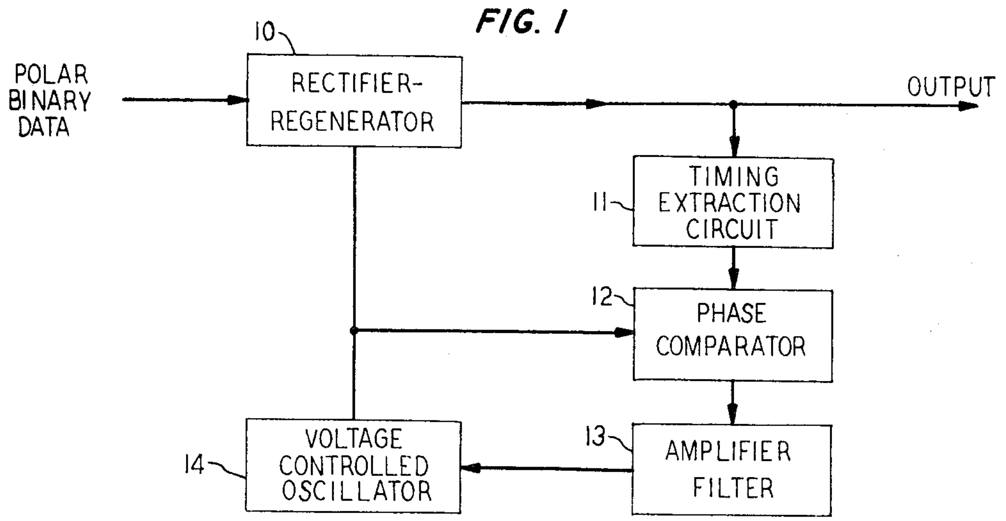
FIG. 1 is a block diagram of a PCM repeater employing the invention.
Figure 2:
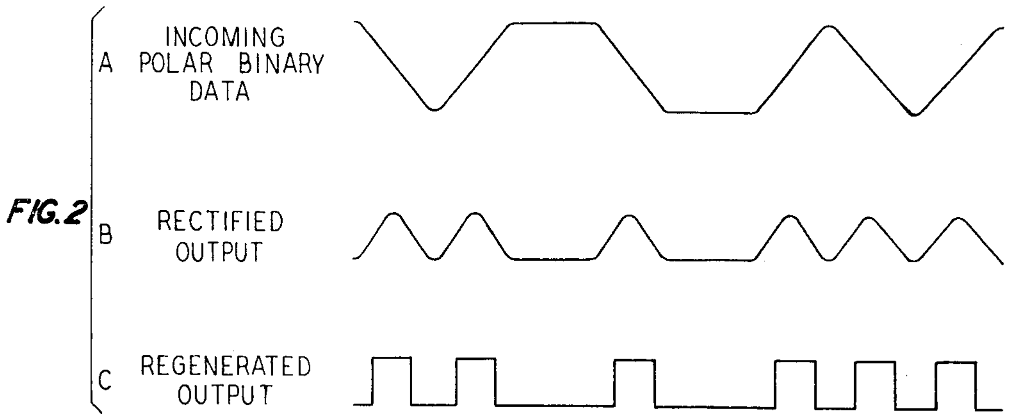
FIG. 2 is a set of curves illustrating the performance of the diagram of FIG. 1.

The arrangement of FIG. 1 is a PCM repeater with polar binary data input, comprising a rectifier-regenerator 10, timing extraction circuit 11, phase comparator 12, amplifier-filter 13, and voltage-controlled oscillator 14. The polar binary input data is shown in FIG. 2A. After it has been rectified in the regenerator, it appears as shown in FIG. 2B. This data is then sampled at a rate determined by the input from the voltage-controlled oscillator 14, and the result is the output shown in FIG. 2C. The pulses of FIG. 2C are then sent to the timing extraction circuit 11, where the missing pulses are filled in. The pulse train with all the timing slots filled is sent to the phase comparator 12 where it is compared with the output from the voltage-controlled oscillator 14. The difference signal output of the phase comparator is sent to an amplifier-filter 13 where pulses from the phase comparator are converted into a DC level which varies with the phase. This level is applied to the voltage-controlled oscillator and changes the frequency or phase of the oscillator. The output of the voltage-controlled oscillator is then returned to the rectifier regenerator, its phase having been corrected to match any change of phase in the incoming polar binary data. In this way the repeater attenuates any high-frequency jitter in the outgoing data stream.

Figure 3:
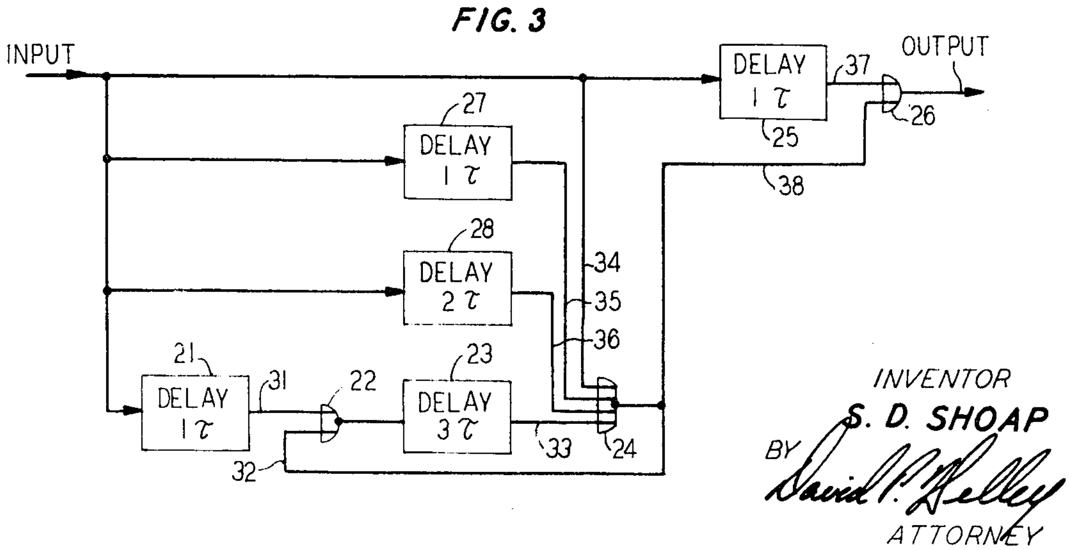
FIG. 3 is a schematic of a possible embodiment of the invention.
Figure 4:
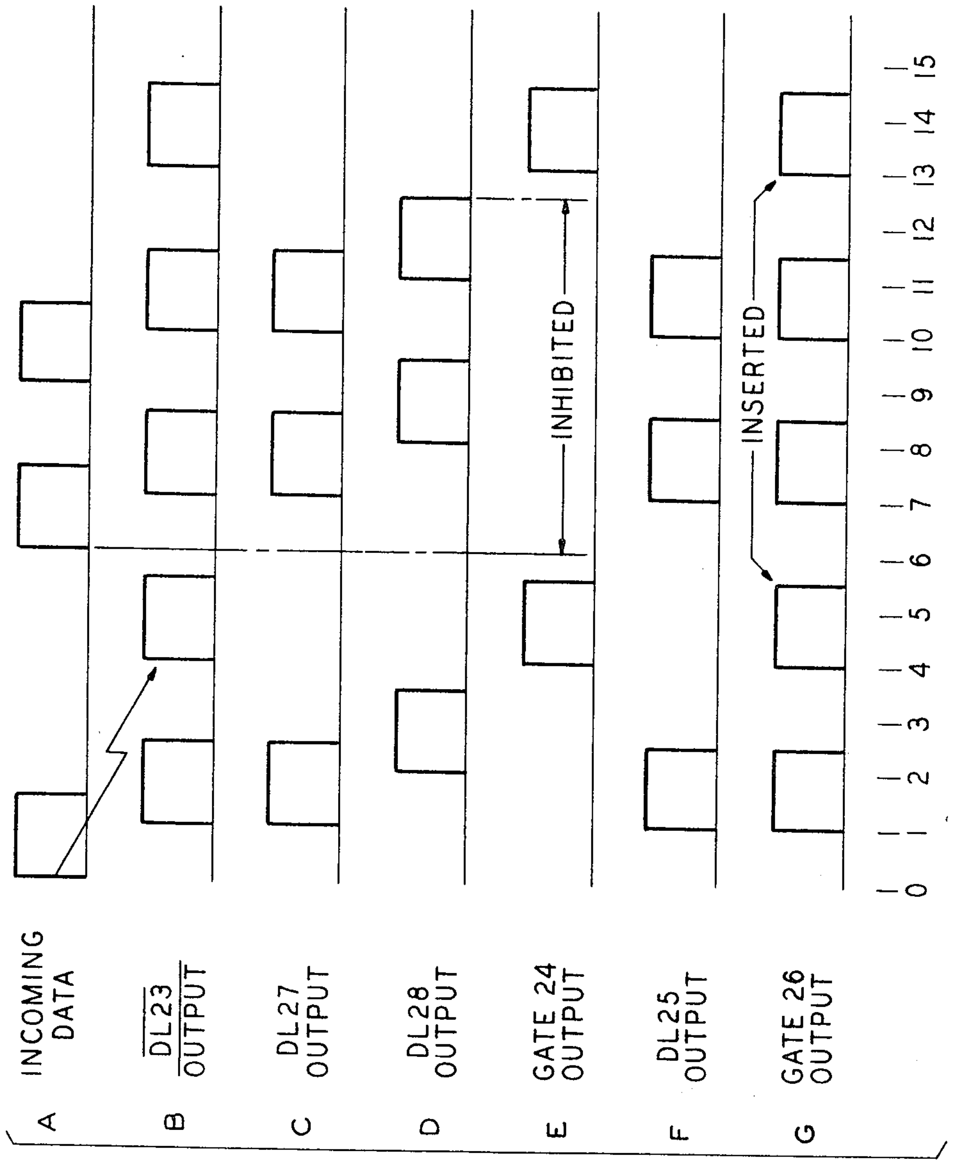
FIG. 4 is a set of curves illustrating the performance of the circuit of FIG. 3.

FIG. 3 is a schematic of the timing extraction circuit of the present invention. A typical input to the recirculator with a 50 percent duty cycle is shown in FIG. 4A. This input is applied to delay 21, which delays the pulse train for one-third of a period and is considered a unit delay. The delay can be created in any standard manner, for example, a length of coaxial cable or a network of passive elements. The output of delay 21 is applied to input 31 of NOR-gate 22, which produces a negative pulse whenever there is a positive pulse on either of its inputs, 31 or 32. The output of NOR-gate 22 is applied to delay 23. Delay 23 delays the output of NOR-gate 22 for a time equal to a period of the basic pulse repetition rate. The output of delay 23 is applied to input 33 of NOR-gate 24. An inverted representation of the output of delay 23 is shown in FIG. 4B. Gate 24 produces a positive output pulse whenever there are no pulses on its inputs. The output of gate 24 is applied to input 32 of gate 22. This creates a recirculating generator with an output at the basic pulse repetition rate determined by delay 23.

The incoming data pulses are also applied to delay 25 which is a one-unit delay. The output of delay 25 is applied to input 37 of OR-gate 26. The output of gate 24 is applied to input 38 of gate 26. Gate 26 produces a positive output pulse whenever there is a pulse on either of its inputs. Therefore, there will be an output from the circuit whenever there is an incoming data pulse. However, the output will be delayed by one time unit. Also, there will be an output whenever there is a pulse from the recirculator.

The incoming data pulses are also applied to input 34 of gate 24, delay 27, and delay 28. Delay 27 is a one-unit delay and its output is applied to input 35 of gate 24. Delay 28 is a two-unit delay and its output is applied to input 36 of gate 24. The outputs of delays 27 and 28 are shown in FIGS. 4C and 4D, respectively. Inputs 34, 35 and 36 of gate 24 have the effect of inhibiting the output of the recirculator (i.e., gate 24) whenever there is an input pulse present. This inhibiting effect also automatically eliminates any transient pulses in the recirculator which reach gate 24 during that period. This is illustrated in FIG. 4E. Therefore, the output of gate 26 contains all of the original timing pulses delayed by one time unit plus the added pulses from the recirculator, thereby creating a continuous pulse train as shown in FIG. 4G. It should be noted that the incoming regenerated pulse will always pass through to the output complete with any jitter it may have. However, if the jitter is so bad that the incoming pulse is more than a unit delay late then it is possible to get part of the recirculating pulse in the output. Therefore, it may be said that the invention is insensitive to jitter which is less than a unit delay in time.

Figure 5:
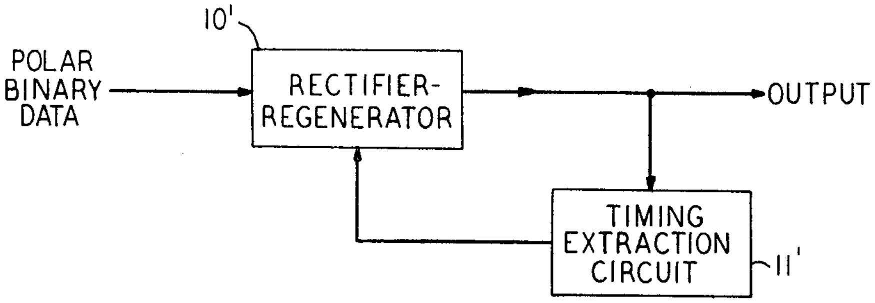
FIG. 5 is a block diagram of a PCM repeater employing the invention without a voltage-controlled oscillator.

FIG. 5 is a block diagram of a PCM repeater employing the invention without a voltage-controlled oscillator. The input is applied to the rectifier-regenerator 10′ and its output is applied to the timing extraction circuit 11′. The output of the timing extraction circuit is fed directly back to the rectifier-regenerator, thereby determining when the rectifier-regenerator should sample the incoming data train. This arrangement can be used only when the frequency of the incoming pulse train is well known and does not vary substantially. Also, there must be very little pulse jitter in a system of this type.

Figure 6:
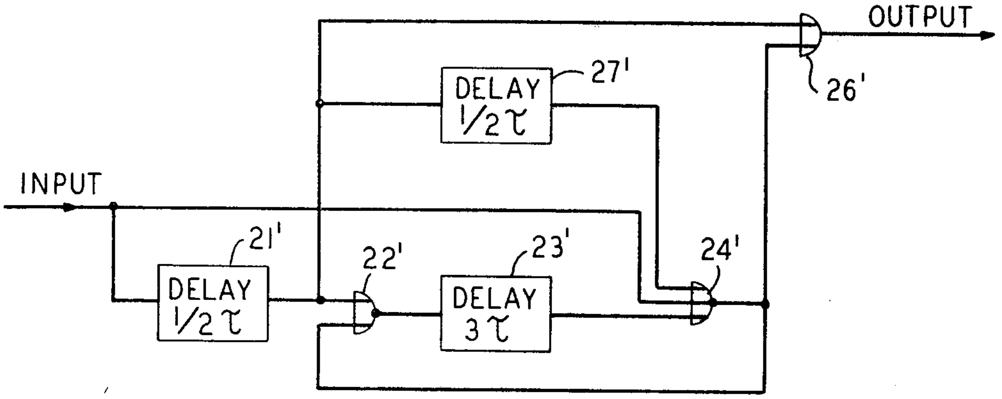
FIG. 6 is a schematic of a possible embodiment of the invention with fewer parts.
Figure 7:
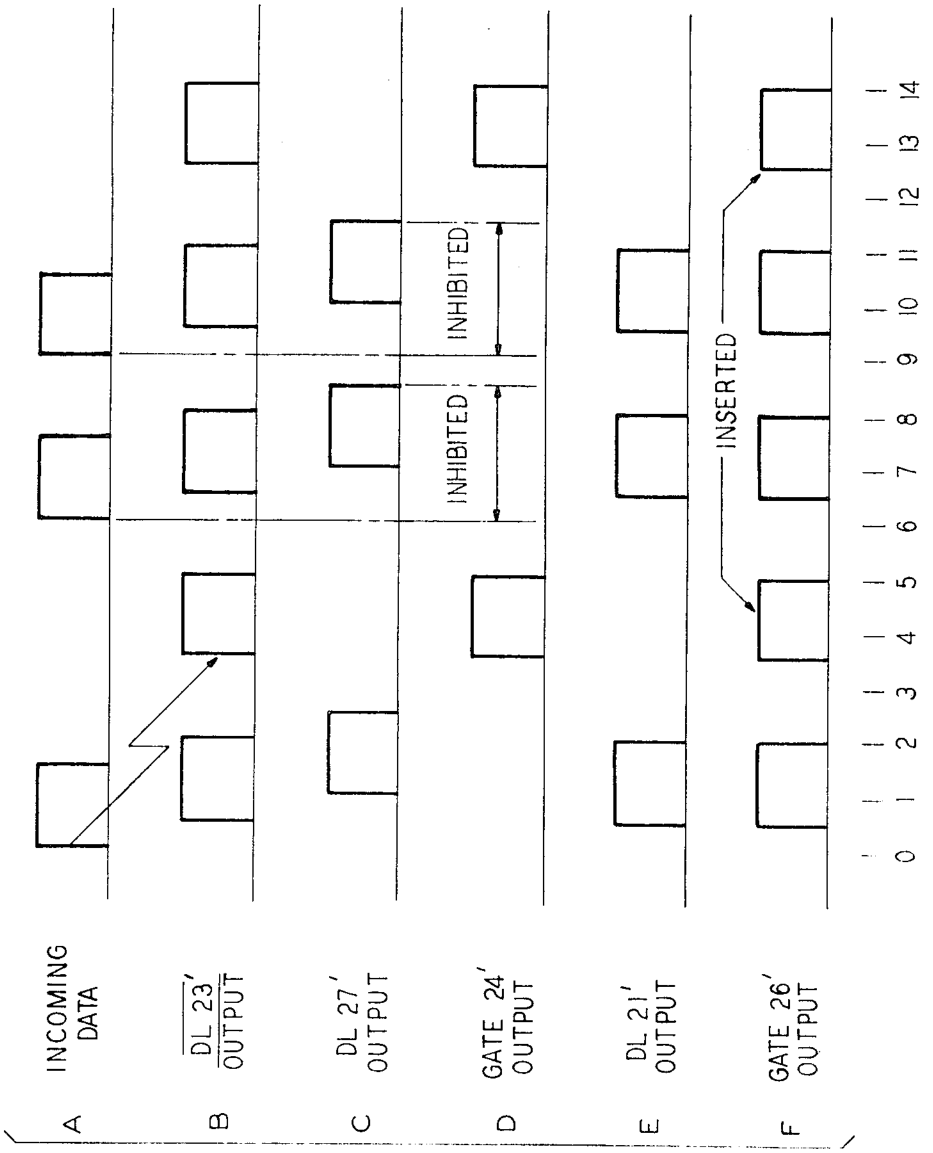
FIG. 7 is a set of curves illustrating the performance of the circuit of FIG. 6.

A savings in parts in the implementation of the invention as shown in FIG. 3 can be achieved by combining unit delays 21, 25 and 27. These elements delay the incoming pulse train by one time unit. Therefore, they could be combined together in one unit, creating a savings in parts. Also, delay unit 28 could be achieved by using the output of the combined delay unit with another unit delay connected in series. Additional savings in parts can be created by a different spacing of the pulses used to inhibit the recirculator. An embodiment of this is shown in FIG. 6. FIG. 6 is identical to FIG. 3 except that delay units 25 and 28 have been eliminated and delay units 21′ and 27′ have half the values shown in FIG. 3. Equivalent parts have the same number designation but are marked with a prime. This circuit works the same as FIG. 3 except that the spacing of the inhibiting pulses has been changed. This can be seen by comparing FIG. 7 with FIG. 4. This arrangement causes a decrease in the effectiveness of the automatic deletion of transient pulses. However, under certain circumstances it may be sufficient.

Figure 8:
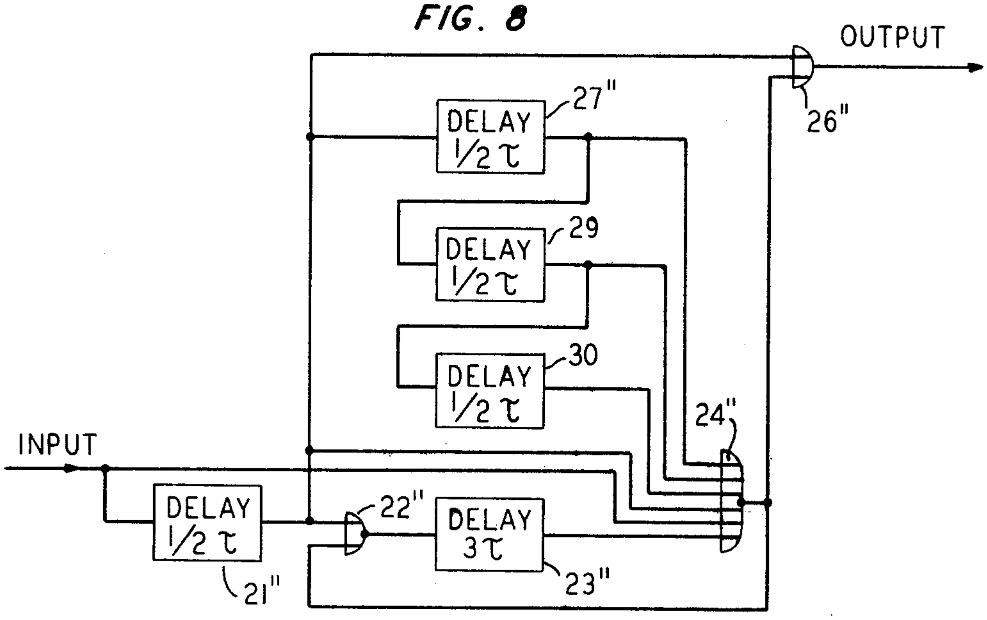
FIG. 8 is a schematic of a possible embodiment of the invention with other than a 50 percent duty cycle and with total automatic deletion of transient pulses.
Figure 9:
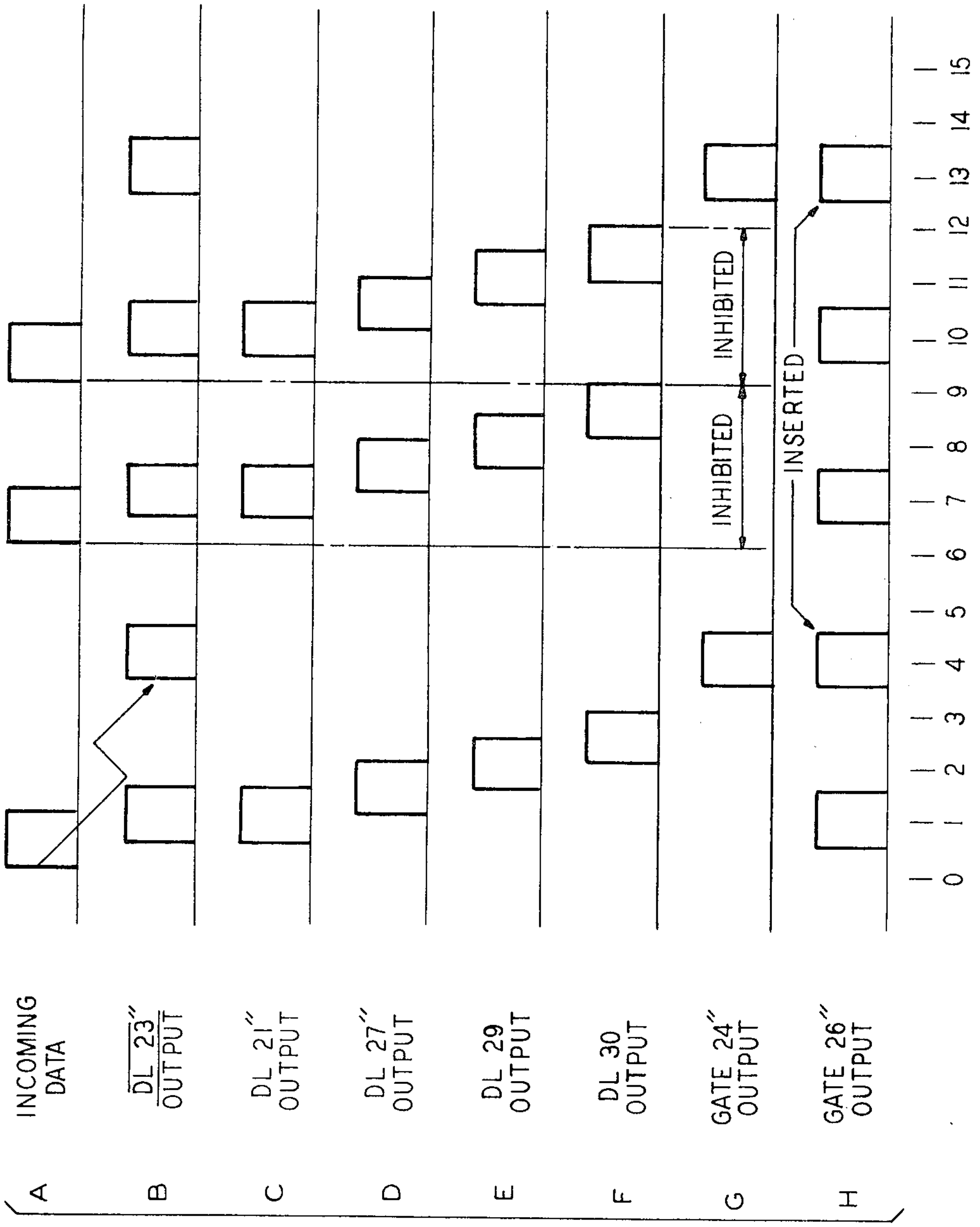
FIG. 9 is a set of curves illustrating the performance of the circuit of FIG. 8.

FIG. 8 shows an embodiment of the invention where the duty cycle of the pulse train is less than 50 percent. It is similar in arrangement to FIGS. 3 and 6 and equivalent parts are marked with double primes. FIG. 8 differs from FIG. 6 in that it has a delay 29 and delay 30, both equal to half a time unit. FIG. 9 indicates the various waveforms for FIG. 8. The delay elements used in this invention may have arbitrary values except that delays 21 and 25 must be equal and delay 23 must equal a period of the incoming pulse rate. The delays which make up the inhibit function need not be multiples of delay units 21 or 25. They may take on any value provided their combined effect is to block the output of the recirculator for one period.

The foregoing embodiments of the principles of the invention are for the purpose of illustrating those principles. Those principles involve the use of a recirculating generator to insert timing pulses in a data train and the use of various delays connected in various configurations for the purposes of inhibiting the output whenever a data pulse is present and for the elimination automatically of transient pulses.

What is claimed is:

1. A circuit for inserting pulses in the empty time slots of an incoming digital pulse train, said pulse train being characterized by a particular pulse repetition rate and said circuit comprising:

first gating means having first and second inputs for producing an output pulse upon the occurrence of a pulse on either of said inputs, means for applying the input signal delayed for a first interval equal to a fraction of a pulse period to said first input, means for applying the output of a gated recirculating pulse generator to the second input of said gating means;

said recirculating pulse generator comprising a second gating means having two inputs for producing a negative output pulse upon the occurrence of a positive pulse on either of said inputs, means for applying the input signal delayed for the aforementioned first interval to one input of said second gating means, means for applying the output of said second gating means delayed for a full pulse period to one input of a third gating means having a plurality of inputs, said third gating means producing a positive pulse output on the simultaneous absence of a positive pulse on all of said plurality of inputs, means for applying the output of said third gating means to the second input of said second gating means, thereby creating a recirculating pulse generator;

means for applying said input pulse train to a second input of said third gating means, means for applying the input signal delayed for the aforementioned first interval to a third input of said third gating means, means for applying the input signal delayed for increasing intervals up to a full pulse period to the other inputs of said third gating means, means for applying the output of said third gating means to the second input of said first gating means, the various delay intervals and multiples thereof being so related that said third means applies a pulse to the input of said first means only in the absence of a pulse at the other input of said first means.

2. A timing circuit for generating timing information from input pulse coded data, said circuit having an input and an output and comprising:

a delay recirculator circuit comprising a two-input NOR gate, means for delaying the input pulse coded data for a first period and applying the delayed data to one input of said two-input gate, a multiinput NOR gate whose output is the output of said recirculator circuit, means for delaying the output of said two-input NOR gate for a second period equivalent to the basic pulse repetition rate of the input pulse coded data and applying the delayed output to one input of said multiinput NOR gate, and means for applying the output of said multiinput NOR gate to the other input of said two-input NOR gate;

inhibiting means for blocking the output of said recirculator circuit whenever a pulse is present at the input to the timing circuit; and gating means for combining the output of said recirculator circuit with the input pulse coded data to produce a continuous series of pulses at the output of said timing circuit.

3. A circuit as claimed in claim 2 wherein said inhibiting means comprises a plurality of delay means for delaying the input pulse coded data for discrete periods, the periods being chosen so that there will be an output from at least one of said plurality of delay means over a period equivalent to the basic pulse repetition rate whenever a data pulse is present at the input to the circuit, and means for applying the outputs of said plurality of delay means and the input pulse coded data to separate inputs of said multiinput NOR gate of said recirculator whereby the output of the recirculator is inhibited when a pulse is present at the input of said timing circuit.

4. A timing circuit as claimed in claim 2 in combination with a rectifier-regenerator whose input is the input of a regenerative repeater and whose output is both the output of said repeater and the input of said timing circuit, a voltage-controlled oscillator, a phase comparator, means for comparing the phase of the output of said timing circuit with the output of said voltage-controlled oscillator in said phase comparator, means for amplifying and filtering the output of said phase comparator, and applying the amplified and filtered signal to the control input of said voltage-controlled oscillator, thereby causing the output of said voltage-controlled oscillator to change frequency in response to said phase comparison, and means for applying the output of said voltage-controlled oscillator to a timing input of said rectifier-regenerator, thereby determining the sampling time in the rectifier-regenerator.

5. A timing circuit as claimed in claim 2 in combination with a rectifier-regenerator whose input is the input of a regenerative repeater and whose output is both the output of said repeater and the input of said timing circuit, means for applying the output of said timing circuit to a timing input of said rectifier-regenerator, thereby determining the sampling time in the rectifier-regenerator.

* * * * *